(12) United States Patent
Zhou et al.

(10) Patent No.: US 11,649,399 B1
(45) Date of Patent: May 16, 2023

(54) ACID PRECURSOR TREATMENT FLUID GENERATING AND/OR RELEASING ACID FOR USE DOWNHOLE IN A SUBTERRANEAN FORMATION

(71) Applicant: Halliburton Energy Services, Inc., Houston, TX (US)

(72) Inventors: Hui Zhou, Houston, TX (US); William Cecil Pearl, Jr., Houston, TX (US); William Walter Shumway, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/522,122

(22) Filed: Nov. 9, 2021

(51) Int. Cl.
*C09K 8/72* (2006.01)
*C09K 8/528* (2006.01)

(52) U.S. Cl.
CPC .............. *C09K 8/72* (2013.01); *C09K 8/528* (2013.01)

(58) Field of Classification Search
CPC .................................. C09K 8/72; C09K 8/528
See application file for complete search history.

(56) References Cited

U.S. PATENT DOCUMENTS

| 4,122,896 A | 10/1978 | Scheuerman et al. | |
| 2014/0162910 A1* | 6/2014 | Braley | C09K 8/516 507/119 |

(Continued)

FOREIGN PATENT DOCUMENTS

WO 2020002011 A1 1/2020

OTHER PUBLICATIONS

Zhou, Hui, Electronic Acknowledgement Receipt, Specification, and Drawings for U.S. Appl. No. 17/333,261, filed May 28, 2021, titled "Strong Acid Precursor Generating Strong Acid For Use Downhole in a Subterranean Formation," 32 pages.

*Primary Examiner* — Silvana C Runyan
(74) *Attorney, Agent, or Firm* — Conley Rose, P.C.; Rodney B. Carroll

(57) ABSTRACT

A method includes providing a treatment fluid including a strong acid precursor defined by the structure:

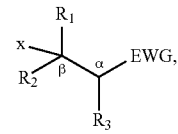

where X is independently selected from fluorine, chlorine, bromine, and iodine; where each of $R_1$, $R_2$, and $R_3$ is independently selected from a hydrogen, X, and a $C_1$ to $C_{10}$ hydrocarbon chain; and where the electron withdrawing group (EWG) is independently selected from a carboxylic acid, carboxylate salt, or carboxylate ester, an orthoester, a sulfonic acid, sulfonate salt, or ester, a phosphonic acid, phosphonate salt, or phosphonate ester, a nitrate, or a cyanide; where Y is hydrogen, a cation, or a $C_1$ to $C_{10}$ hydrocarbon chain; and wherein each R' is independently is independently selected from a hydrogen, X, and a $C_1$ to $C_{10}$ hydrocarbon chain. The method also includes introducing the treatment fluid into a wellbore penetrating a subterranean formation.

14 Claims, 1 Drawing Sheet

(56) References Cited

U.S. PATENT DOCUMENTS

| | | | | |
|---|---|---|---|---|
| 2014/0374099 A1* | 12/2014 | Wagle | ............... | E21B 43/12 |
| | | | | 166/295 |
| 2019/0310237 A1* | 10/2019 | Qiu | ............... | E21B 49/086 |
| 2020/0003040 A1 | 1/2020 | Weider et al. | | |

* cited by examiner

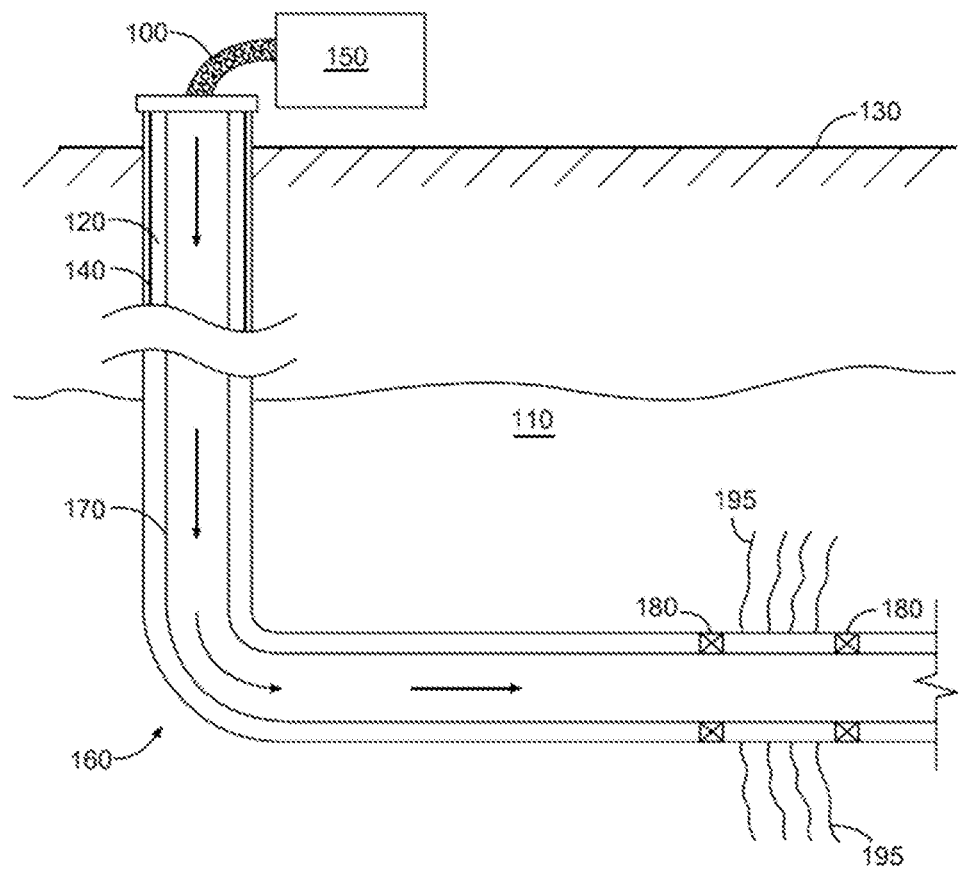

ACID PRECURSOR TREATMENT FLUID GENERATING AND/OR RELEASING ACID FOR USE DOWNHOLE IN A SUBTERRANEAN FORMATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure relates to methods and compositions for treating a subterranean formation.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein.

Some common subterranean treatment operations that employ treatment fluids are acidizing operations. Illustrative acidizing operations may include, for example, matrix acidizing, acid fracturing, scale dissolution and removal, polymer breaking, filter cake dissolution, and the like. These acidizing operations may be used to accomplish a number of purposes. Such purposes may include increasing or restoring the permeability of subterranean formations so as to facilitate the flow of oil and gas from the formation into the well. Additionally, the acid treatments may also be used to remove deposits in the formation along as much of the hydrocarbon flow path as possible and/or to create new flow paths as in matrix acidization.

Although acidizing a portion of a subterranean formation may be beneficial, some acidizing systems have significant drawbacks. For example, one major problem associated with some acidizing treatment systems is that deeper penetration into the formation is not usually achievable because, inter alia, the acid may be spent before it can deeply penetrate into the subterranean formation. The rate at which acidizing fluids react with reactive materials in the subterranean formation is a function of various factors including, but not limited to, acid strength, acid concentration, temperature, fluid velocity, mass transfer, and the type of reactive material encountered. Whatever the rate of reaction of the acidic solution, the solution can be introduced into the formation only a certain distance before it becomes spent. To combat these problems and others, it is desirable to generate and/or release a strong acid downhole for use in these and other various applications.

BRIEF DESCRIPTION OF THE DRAWINGS

These drawings illustrate certain aspects of some of the embodiments of the present disclosure and should not be used to limit or define the claims.

The FIGURE is a diagram illustrating an example of a subterranean formation in which a treatment fluid is introduced in accordance with some embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to methods and compositions for use in a subterranean formation. More particularly, the present disclosure relates to methods and compositions involving a strong acid precursor that generates and/or releases a strong acid for use in the subterranean formation.

The present disclosure provides a composition, for example, a treatment fluid, including a base fluid and a strong acid precursor. The present disclosure also provides methods that include providing the treatment fluid including the base fluid and the strong acid precursor. The methods of the present disclosure may also include introducing the treatment fluid into a wellbore penetrating a subterranean formation. In some embodiments, the methods may further include allowing the strong acid precursor to generate and/or release a strong acid in the subterranean formation. As used herein, the term "generate" and grammatical variants thereof shall be understood to also include the terms "release," "form," "create," and the like and grammatical variants thereof. In some embodiments, the methods may further include allowing the strong acid to acidize the portion of the subterranean formation or damage contained therein. In some embodiments, the methods may further include contacting at least a portion of a biopolymer or a filter cake located in the subterranean formation with the strong acid, wherein the portion of the biopolymer or the filter cake at least partially degrades. In some embodiments, the methods may further include introducing a catalytic acid or a catalytic acid precursor into the wellbore and contacting at least a portion of the treatment fluid with the catalytic acid or the catalytic acid precursor.

Among the many potential advantages to the methods and compositions of the present disclosure, only some of which are alluded to herein, the methods and compositions of the present disclosure may include a strong acid precursor that generates and/or releases a strong acid in situ within a subterranean formation, which may avoid the strong acid becoming prematurely spent (e.g., by reacting with the formation itself, fines, other chemicals, metal surfaces within the formation, and/or undesirable deposits nearest the wellbore) before performing its desired purpose in a desire location within the formation. In some embodiments, the generation and/or release of the strong acid from the strong acid precursor may be delayed until the treatment fluid including the strong acid precursor reaches a desired location within the subterranean formation.

In some embodiments, the generation and/or release of the strong acid in situ within a subterranean formation may allow the strong acid to penetrate deeper into the formation than if the strong acid was introduced directly into the formation or a wellbore penetrating the formation. Additionally, in some embodiments, the methods and compositions of the present disclosure may provide improved uniform placement of the strong acid in the subterranean formation. For example, an entire interval in the subterranean formation may be evenly soaked with a strong acid as opposed to spot placement of the strong acid.

In some embodiments, the strong acid that is generated and/or released in accordance with the methods and compositions of the present disclosure may be used in any suitable acidizing treatment to acidize at least a portion of a subterranean formation or one or more deposits contained therein, such as deposits that may reduce permeability. As used herein, the term "deposits" includes, but is not limited to, filter cakes, biopolymers, synthetic polymers, hydrates, surfactants (including viscoelastic surfactants), bridging agents, scale deposits, skin deposits, and geological deposits. Furthermore, in some embodiments, the methods and compositions of the present disclosure may effectively generate wormholes to stimulate production in carbonate-bearing subterranean formations, dissolve damage, and remove fines to recover production in formations at elevated temperatures.

In some embodiments, the methods and compositions of the present disclosure may also be less corrosive to tubing, casing, and other downhole equipment compared to conventional acidizing systems. Moreover, in some embodiments, the methods and compositions of the present disclosure may permit corrosion considerations to not be a limiting factor in the design of the acidizing systems. Furthermore, the methods and compositions of the present disclosure may reduce the hazards associated with acid handling for personnel and equipment. Additionally, the methods and compositions of the present disclosure may allow for the introduction of more concentrated acids, especially as compared to conventional acidizing systems. In some embodiments, the methods of the present disclosure may include providing a treatment fluid that includes a base fluid and a strong acid precursor.

The treatment fluids of the methods and compositions of the present disclosure may include any suitable base fluid as will be appreciated on one of skill in the art upon viewing this disclosure. The term "base fluid" refers to the major component of the fluid (as opposed to components dissolved and/or suspended therein), and does not indicate any particular condition or property of that fluid such as its mass, amount, pH, etc. In some embodiments, the base fluid is and/or includes an aqueous fluid or a non-aqueous fluid. Aqueous fluids that may be suitable for use in the methods of the present disclosure may include water from any source. Such aqueous fluids may include fresh water, salt water (e.g., water containing one or more salts dissolved therein), brine (e.g., saturated salt water), seawater, or combinations thereof. In some embodiments of the present disclosure, the aqueous fluids include one or more ionic species, such as those formed by salts dissolved in water. For example, seawater and/or produced water may include a variety of divalent cationic species dissolved therein. In some embodiments, the density of the aqueous fluid can be adjusted, among other purposes, to provide additional particulate transport and suspension in the methods of the present disclosure. In some embodiments, the pH of the aqueous fluid may be adjusted (e.g., by a buffer or other pH adjusting agent) to a specific level, which may depend on, among other factors, the types of viscosifying agents, acids, and other additives included in the fluid. Examples of non-aqueous fluids that may be suitable for use in the methods of the present disclosure include, but are not limited to, oils, hydrocarbons, organic liquids, and the like. In some embodiments, the base fluid may include a mixture of one or more fluids and/or gases, including but not limited to emulsions, foams, and the like.

In some embodiments, the strong acid precursors of the treatment fluid as disclosed herein is a chemical that generates and/or releases a strong acid (e.g., HCl, HI, HBr, and HF), such as for use downhole in a subterranean formation. In some embodiments, the strong acid precursor includes an organic molecule having an electron-withdrawing group (EWG) and at least one halogen (e.g., Cl, I, Br, or F) at the β-position with respect to the EWG. Examples of a suitable EWG include a carboxylic acid, a carboxylate salt, a carboxylate ester, an orthoester, a sulfonic acid, a sulfonate salt or ester, a phosphonic acid, a phosphonate salt or ester, a nitrate, or a cyanide group. For example, the strong acid precursor may include a compound defined by Structure 1:

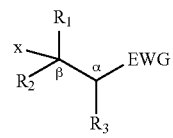

Structure 1 where X may be a halogen independently selected from fluorine (—F), chlorine (—Cl), bromine (—Br), and iodine (—I); where each of $R_1$, $R_2$, and $R_3$ may be independently selected a hydrogen, X, and a $C_1$ to $C_{10}$ hydrocarbon chain; and where the EWG may be selected a carboxylic acid, carboxylate salt, or carboxylate ester (—$CO_2Y$), an orthoester (—$C(OR')_3$), a sulfonic acid, sulfonate salt, or ester (—$CO_2Y$), a phosphonic acid, phosphonate salt, or phosphonate ester (—C—$PO(OY)_2$), a nitrate (—$CNO_2$), or a cyanide (—CN); where Y is hydrogen (—H), a cation, or a $C_1$ to $C_{10}$ hydrocarbon chain; and where each R' is independently may be independently selected a hydrogen, X, and a $C_1$ to $C_{10}$ hydrocarbon chain.

In some embodiments, the strong acid precursor includes at least one compound independently selected from:

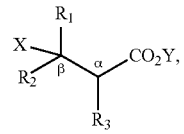

Structure 2

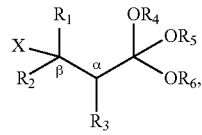

Structure 3

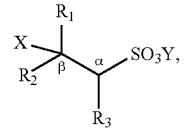

Structure 4

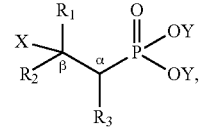

Structure 5

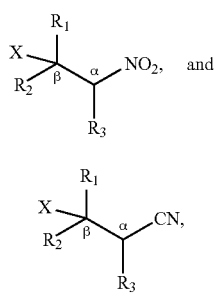

Structure 6

Structure 7 where X may be a halogen independently selected from fluorine (—F), chlorine (—Cl), bromine (—Br), and iodine (—I); where Y is hydrogen (—H), a cation, or a $C_1$ to $C_{10}$ hydrocarbon chain; where each of $R_1$, $R_2$, and $R_3$ may be independently selected from: a hydrogen, X, and a $C_1$ to $C_{10}$ hydrocarbon chain; and where each of $R_4$, $R_5$, and $R_6$ may be independently selected from a hydrogen and a $C_1$ to $C_{10}$ hydrocarbon chain.

As used herein, a "hydrocarbon chain" may be, unless otherwise specifically noted, branched, unbranched, non-cyclic, and/or cyclic; it may be substituted or unsubstituted (for example, it may or may not contain one or more additional moieties or functional groups in place of one or more hydrogen atoms in the hydrocarbon chain); it may be saturated or unsaturated; and/or it may be bonded to at least one other hydrocarbon chain. Furthermore, as used herein, the nomenclature "$C_x$ to $C_y$," refers to the number of carbon atoms in the hydrocarbon chain (here, ranging from x to y carbon atoms). As used herein, "independently" refers to the notion that the preceding items may be the same or different. As used herein, the term "substituted" refers to one or more of the hydrogen atoms in the hydrocarbon chain being replaced by one or more functional groups. In such embodiments, the hydrocarbon chain may be substituted with one or more functional groups independently selected from an ether, an ester, a hydroxyl, an alkane, an alkene, an alkyne, and combinations thereof.

In some embodiments, one, two, three, four, five, of all of $R_1$, $R_2$, $R_3$, $R_4$, $R_5$, and $R_6$ may be a hydrogen. In some embodiments, the length of the hydrocarbon chains for each of $R_1$, $R_2$, $R_3$, $R_4$, $R_5$, and $R_6$ may independently range from $C_1$ to $C_2$, from $C_1$ to $C_3$, from $C_1$ to $C_4$, from $C_1$ to $C_5$, from $C_1$ to $C_6$, from $C_1$ to $C_7$, from $C_1$ to $C_5$, from $C_1$ to $C_9$, and, from $C_1$ to $C_{10}$. In some embodiments, and not intending to be bound by theory, shorter chain lengths and/or the inclusion of hydroxyl groups, may increase the water solubility of the strong acid precursor, for example, to promote the generation and/or release of a strong acid.

In some embodiments, two or more of $R_1$, $R_2$, and/or $R_3$ may be a $C_1$ to $C_{10}$ hydrocarbon chain and may be bonded together. In some embodiments, two or more of $R_4$, $R_5$, and/or $R_6$ may be a $C_1$ to $C_{10}$ hydrocarbon chain and may be bonded together. In such embodiments, the bonding together of two or more of $R_1$, $R_2$, and/or $R_3$ and/or two or more of $R_4$, $R_5$, and/or $R_6$ may result in the formation of a cyclic structure. In such embodiments, the cyclic structure may include a $C_2$ to $C_{10}$ hydrocarbon chain.

In some embodiments, the strong acid precursor may be present in the treatment fluids of the present disclosure in an amount sufficient to generate and/or release the desired amount of strong acid. In some embodiments, the strong acid precursor may be present in the treatment fluid in an amount from about 0.1% to about 50% by volume of the treatment fluid. A person skilled in the art, with the benefit of this disclosure, will appreciate the amount of the strong acid precursor used in the treatment fluid may vary depending upon the application of the treatment fluid.

As described elsewhere herein, in one or more specific embodiments, the treatment fluids of the present disclosure may be used in acidizing applications, for example, matrix acidizing, acid fracturing, scale dissolution and removal, polymer breaking, filter cake dissolution, and the like. In some such embodiments, the strong acid precursor may be present in the treatment fluid in an amount from about 1% to about 50% by volume of the treatment fluid, additionally or alternatively, from about 2% to about 40%, additionally or alternatively, from about 3% to about 20% by volume of the treatment fluid.

As described elsewhere herein, in one or more specific embodiments, the treatment fluids of the present disclosure may be used in other applications, including, but not limited to, reducing the viscosity of a viscosified fluid, for example, a viscosified fracturing fluid. In some such embodiments, the strong acid precursor may be present in the treatment fluid in an amount from about 0.1% to about 10% by volume of the treatment fluid, additionally or alternatively, from about 0.5% to about 7%, additionally or alternatively, from about 1% to about 5% by volume of the treatment fluid.

In some embodiments, the treatment fluids of the present disclosure may include one or more one or more additional components or additives. For example, in some embodiments, the treatment fluid may include one or more polar organic solvents. In such embodiments, the polar organic solvent may improve the solubility of the strong acid precursor in aqueous base fluids. Organic polar solvents that may be suitable for use in some embodiments of the present disclosure include alcohols, glycols, glycol ethers, esters, amides, and their derivatives. Examples of organic polar solvents include, but are not limited to, methanol, ethanol, isopropanol, n-butanol, iso-butanol, tert-butanol, ethylene glycol, polyethylene glycol, propylene glycol, butanediol, pentanediol, glycerol, polyglycerol, 2-pyrrolidone, N-methyl-2-pyrrolidone, ethylene glycol monobutyl ether, polyglycol ethers, and combination thereof. In some embodiments, the polar organic solvent may be present in the treatment fluid in an amount up to about 70% by volume of the treatment fluid, additionally or alternatively, from about 1% to about 50%, additionally or alternatively, from about 2% to about 40%, additionally or alternatively, from about 5% to about 30% by volume of the treatment fluid.

Additionally or alternatively, in some embodiments, the treatment fluids of the present disclosure may include one or more surfactants. In such embodiments, surfactants that may be suitable for use in some embodiments of the present disclosure may be independently selected from cationic surfactants, anionic surfactants, zwitterionic surfactants, nonionic surfactants and combinations thereof. Examples of cationic surfactants that may be suitable for use in some embodiments of the present disclosure may be independently selected from alkyl amines, alkyl amine salts, quaternary ammonium salts such as trimethyltallowammonium halides (e.g., trimethyltallowammonium chloride, trimethyltallowammonium bromide), amine oxides, alkyltrimethyl amines, triethyl amines, alkyldimethylbenzylamines, cetyltrimethylammonium bromide, alkyl dimethyl benzyl-ammonium chloride, trimethylcocoammonium chloride, derivatives thereof, and combinations thereof. Examples of anionic surfactants that may be suitable for use in some embodiments of the present disclosure may be independently selected from alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, $C_8$ to $C_{22}$ alkylethoxylate sulfate, alkylphenol ethoxylate sulfate (or salts thereof), monoalkylphosphates, polyalkylphosphates, fatty acids, alkali salts of fatty acids, glyceride sulfates, sodium salts of fatty acids, soaps, derivatives thereof, and combinations thereof. Examples of amphoteric or zwitterionic surfactants that may be suitable for use in some embodiments of the present disclosure may be independently selected from dihydroxyl alkyl glycinate, alkyl amphoacetate, or propionate, alkyl betaine, alkyl amidopropyl betaine and alkylimino mono- or di-propionates derived from certain waxes, fats and oils. Examples of nonionic surfactants that may be suitable for use in some embodiments of the present disclosure may be independently selected from alcohol oxylalkylates, alkyl phenol oxylalkylates, nonionic esters such as sorbitan esters, alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylate, alkyl polyglucoside, derivatives thereof, and combinations thereof. In some embodiments, the surfactant may be present in the treatment fluid in an amount up to about 2.0% by volume of the treatment fluid, additionally or alternatively, from about 0.01% to about 2.0%, additionally or alternatively, from about 0.2% to about 1.5%, additionally or alternatively, from about 0.5% to about 1.0% by volume of the treatment fluid.

Additionally or alternatively, in some embodiments, the treatment fluids of the present disclosure may include one or more corrosion inhibitors. In such embodiments, corrosion inhibitors that may be suitable for use in some embodiments of the present disclosure include any surfactant that is capable of inhibiting corrosion of metal surfaces (e.g., a film forming corrosion inhibitor). In some embodiments, the corrosion inhibitor may be independently selected from a hydrophilic moiety, and the hydrophilic moiety may include a quaternary amine, imine, amide, imidazoline, pyridine, carboxylic acid, phosphate ester, thiol group, a salt of any of the foregoing, and combinations thereof. In some embodiments, the hydrophilic moiety may be attached to or incorporated into one or more hydrocarbon chains having hydrophobic properties. In such embodiments, the hydrocarbon chains may independently include from about 8 to about 22 carbons and may be linear or branched, cyclic or acyclic, and/or saturated or unsaturated. Additionally or alternatively, in such embodiments, the hydrocarbon chains may be independently substituted with a functional group including one or more of: ether, ester, hydroxyl, alkane, alkene, alkyne and combinations thereof. In some embodiments, the corrosion inhibitor may be a film forming corrosion inhibitor. In some embodiments, the corrosion inhibitor may be present in the treatment fluid in an amount up to about 2.0% by volume of the treatment fluid, additionally or alternatively, from about 0.01% to about 2.0%, additionally or alternatively, from about 0.2% to about 1.5%, additionally or alternatively, from about 0.5% to about 1.0% by volume of the treatment fluid.

Additionally or alternatively, in some embodiments, the treatment fluids of the present disclosure optionally may include any number of additional additives, examples of which may be independently selected from buffering agents, salts, acids, diverting agents, fluid loss control additives, gas, nitrogen, carbon dioxide, surface modifying agents, tackifying agents, foamers, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), proppant particles, the like, and combinations thereof. The particular additive or combination of additives may be selected based upon factors including the intended use for the treatment fluid, the relevant environmental conditions, and the intended characteristics of the treatment when so-used.

In some embodiments, the methods of the present disclosure may include introducing the treatment fluid including one or more strong acid precursors of the present disclosure into a wellbore penetrating a subterranean formation. In some embodiments of the present disclosure, the methods of the present disclosure may also include allowing the one or more strong acid precursors of the present disclosure to generate and/or release a strong acid in the subterranean formation. Without being limited to any particular theory or mechanism, it is believed that the strong acid precursor may undergo β-elimination to generate and/or release stoichiometric amounts of a strong acid (HX) and an α,β-unsaturated compound, according to the particular electron-withdrawing group (EWG), as shown in Reaction Sequence 1, below.

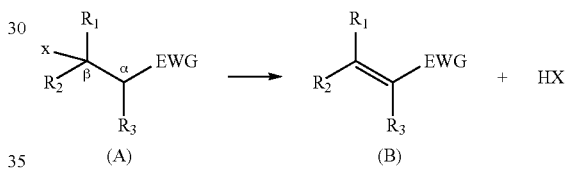

Reaction Sequence 1

In one or more particular embodiments, for example, depending upon the particular EWG and again without being limited to any particular theory or mechanism, the generation of the strong acid may proceed in multiple steps, for example, as shown in Reaction Sequence 2, below.

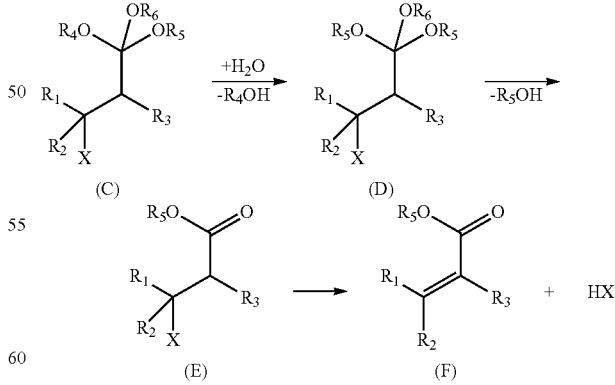

Reaction Sequence 2

For example, in the particular embodiment illustrated by Reaction Sequence 2, the strong acid precursor initially includes an orthoester as the EWG (C), which may be hydrolyzed under mildly acidic conditions, via an intermediate (D), to form into an ester or carboxylic acid (E), which subsequently undergoes β-elimination to generate and/or release stoichiometric amounts of a strong acid (e.g., HX) and an α,β-unsaturated ester or carboxylic acid (F).

In some embodiments, one or more of the reactions by which the strong acid precursor generates and/or releases a strong acid may proceed in the presence of an aqueous fluid. In some embodiments, the treatment fluid may include an aqueous base fluid and the strong acid precursor, and the strong acid precursor may generate and/or release a strong acid in the presence of the aqueous base fluid. In other embodiments, the treatment fluid may include a non-aqueous base fluid and the strong acid precursor, for example, such that an aqueous fluid is absent from the treatment fluid in substantial amounts. In such embodiments, at least a portion of the treatment fluid may contact an aqueous fluid located in the wellbore and/or subterranean formation (e.g., produced from the formation or provided to the wellbore and/or formation separately), and the strong acid precursor may generate and/or release a strong acid in the presence of that aqueous fluid.

In some embodiments, the strong acid precursor may be selected such that the strong acid precursor generates and/or releases the strong acid upon the passage of a desired duration and/or upon the strong acid precursor being placed in a particular environment.

For example, in some embodiments, the particular halogen present at the β position of the strong acid precursor, for example, the halogen that will undergo β-elimination, may be selected based on the rate of β-elimination in order to control the timing of the generation and/or release of the strong acid. Without being limited to any particular theory or mechanism, the rate of β-elimination from the strong acid precursors disclosed herein may vary depending upon the particular halogen that is present. In some particular embodiments, the rate of β-elimination from the strong acid precursors decreases in the following order iodine (I), then bromine (Br), then chlorine (Cl), then fluorine (F), the presence of otherwise similar conditions. That is, iodine may exhibit the highest rate of β-elimination and fluorine may exhibit the lowest rate of β-elimination. In some embodiments, a halogen having a relatively higher rate of β-elimination may be selected for use instead of a halogen having a relatively lower rate of β-elimination, for example, iodine or bromine instead of chlorine or fluorine, in order to achieve a faster generation and/or release of the strong acid. In other embodiments, a halogen having lower rate of β-elimination may be selected for use instead of a halogen having a higher rate of β-elimination, for example, chlorine or fluorine instead of iodine or bromine, in order to achieve a slower or delayed generation and/or release of the strong acid.

Additionally or alternatively, in some embodiments, the generation and/or release of the strong acid by the strong acid precursor generated may be at least partially dependent upon the environmental conditionals proximate the strong acid generator, for example, when deployed. Without being limited to any particular theory or mechanism, hydrolysis of the strong acid precursor, as shown in the above reaction sequence, may be amplified under mildly acidic conditions (e.g., pH less than 7). Accordingly, once the strong acid starts to generate and/or release, the hydrolysis shown in the above reaction sequence may become self-amplifying due to the presence of H+ in the fluid containing the strong acid precursor. Additionally or alternatively, in some embodiments, the hydrolysis shown in the above reaction sequence may be initiated and/or accelerated through the introduction of a catalytic acid or a catalytic acid precursor into the proximate environment, which may lower the pH proximate to the strong acid precursor. Additionally or alternatively, and again without being limited to any particular theory or mechanism, hydrolysis of the strong acid precursor, as shown in the above reaction sequence, may be initiated and/or accelerated by a change in temperature of the environment proximate the strong acid precursor (e.g., due to the temperature of the subterranean formation).

In some embodiments, it may be desirable to speed up the generation and/or release of the strong acid. In such embodiments, the methods of the present disclosure may include introducing a catalytic acid or a catalytic acid precursor into the wellbore. In some embodiments, the catalytic acid or the catalytic acid precursor may be introduced separately from the treatment fluid. In such embodiments, the catalytic acid or the catalytic acid precursor may contact the treatment fluid (or other fluid within the subterranean formation containing the strong acid precursor) and initiate and/or accelerate hydrolysis of the strong acid precursor, resulting in the generation and/or release of a strong acid. In other embodiments, the catalytic acid or the catalytic acid precursor may be included in the treatment fluid and introduced into the wellbore at the same time as the strong acid precursor. In such embodiments, the catalytic acid or the catalytic acid precursor may initiate and/or accelerate hydrolysis of the strong acid precursor, thereby resulting in the generation and/or release of a strong acid shortly after the introduction of the treatment fluid into the wellbore. Examples of catalytic acids suitable for some embodiments of the present disclosure include, but are not limited to, inorganic acids, sulphuric acid, sulfamic acid, acidic anhydrides, boric acid, boron trihalides, organoboranes, aluminum trihalides, trimethylaluminum, zinc dichloride, titanium tetrachloride, tin dichloride, tin tetrachloride, ferric chloride, organic acids, formic acid, acetic acid, monochloroacetic acid, dichloroacetic acid, trichloroacetic acid, sulfonic acids, sulfonic acids, methanesulfonic acid, p-toluenesulfonic acid, lactic acid, glycolic acid, oxalic acid, propionic acid, butyric acid, and combinations thereof. Examples of catalytic acid precursors suitable for some embodiments of the present disclosure include, but are not limited to, orthoesters, polyorthoesters, organic esters of carboxylic acids (e.g., formates, acetates, propanoates, lactates), sulfonates, sulfates, and combinations thereof.

In some embodiments, the catalytic acid or the catalytic acid precursor may be introduced in an amount from about 0.010% to about 50% by volume of the treatment fluid, additionally or alternatively, from about 0.1% to about 5%, additionally or alternatively, from about 0.5% to about 3% by volume of the treatment fluid. In some embodiments, the strong acid precursor may generate and/or release a strong acid when exposed to a certain temperature (e.g., in a subterranean formation). In some embodiments, the strong acid precursor may generate and/or release a strong acid in a subterranean formation having a temperature of from about 20° C. (68° F.) to about 204° C. (400° F.), additionally or alternatively, from about 20° C. (68° F.) to about 177° C. (350° F.), additionally or alternatively, a temperature of at least 20° C. (68° F.), additionally or alternatively, a temperature as low as any of 25, 30, 35, 40, 45, 50, 55, 60, 65, 70, 75, 80, 85, 90, 95, 100, 105, 110, 115, 120, 125, and 130° C.

In some embodiments, it may be desirable to slow down the generation and/or release of the strong acid to, for example, provide a desired time delay and/or placement of the treatment fluid. In such embodiments, the methods of the present disclosure may include introducing a base into the wellbore. In some embodiments, the base may be introduced separately from the treatment fluid. In such embodiments, the base may contact the treatment fluid (or other fluid within the subterranean formation containing the strong acid precursor) so as to increase the pH of the fluid, thereby slowing the generation and/or release of the strong acid. In other embodiments, the base may be included in the treatment fluid and introduced into the wellbore at the same time as the strong acid precursor. In such embodiments, the treatment fluid may have an initial pH of about 7.0 or greater, additionally or alternatively, an initial pH of from about 7.0 to about 14.0, additionally or alternatively, an initial pH of from about 8.0 to about 13.0, additionally or alternatively, initial pH of from about 9.0 to about 13.0.

Examples of bases suitable for some embodiments of the present disclosure include, but are not limited to, inorganic bases, alkali metal or alkaline earth metal oxides, alkali metal or alkaline earth metal hydroxides, alkali metal or alkaline earth metal carbonates, alkali metal or alkaline earth metal bicarbonates, ammonia, organic bases, ammonium hydroxides, tetramethylammonium hydroxide, amines, pyridines, imidazoles, and combinations thereof. In some embodiments, the base may be introduced in an amount from about 0.01% to about 10% by volume of the treatment fluid, additionally or alternatively, from about 0.10% to about 50%, additionally or alternatively, from about 1% to about 5% by volume of the treatment fluid.

In some embodiments, the pH of the treatment fluid may decrease after being introduced into the wellbore, for example, as strong acid is generated and/or released from the strong acid precursor. In some embodiments, the pH of the treatment fluid may be about 3 or less after the treatment fluid has been introduced into and/or present within the wellbore for a given duration, for example, within about 2 hours after the treatment fluid has been introduced into and/or present within the wellbore, additionally or alternatively, within about 24 hours after the treatment fluid has been introduced into and/or present within the wellbore, additionally or alternatively, within about 72 hours after the treatment fluid has been introduced into and/or present within the wellbore, additionally or alternatively, within about 5 days after the treatment fluid has been introduced into and present within the wellbore.

In some embodiments, the treatment fluid of the present disclosure may be used during or in conjunction with various subterranean and/or wellbore-servicing operations. For example, in some embodiments, the treatment fluid of the present disclosure may be used in the course of and/or after drilling operations in which a wellbore has been drilled to penetrate a subterranean formation.

In some embodiments, the treatment fluids of the present disclosure may be introduced into and/or circulated in the wellbore after drilling so as to contact a biopolymer within the wellbore and/or subterranean formation, among other purposes, to at least partially degrade and/or remove one or more portions of the biopolymer. Examples of such biopolymers include, but are not limited to, xanthan gum, scleroglucan gum, diutan gum, guar gum, Whelan gum, and derivatives thereof, such as hydroxypropyl guar and carboxymethylhydroxypropyl guar, cellulose derivatives, such as hydroxyethylcellulose, carboxymethylcellulose, polyanionic cellulose, and starch and its derivatives, such as pregelatinized starch, carboxymethyl starch, chemically modified starch, and crosslinked starch, and combinations thereof. In some embodiments, circulation of the treatment fluid in the wellbore and/or subterranean formation may be accomplished using various pumping and servicing equipment.

In some embodiments, the treatment fluids of the present disclosure may be introduced into and/or circulated in the wellbore after drilling to contact a filter cake deposited on the walls of the wellbore and/or in the subterranean formation, among other purposes, to at least partially degrade and/or remove one or more portions of the filter cake. Additionally or alternatively, in some embodiments, the treatment fluids of the present disclosure may be used prior to placement of cement and/or casing within a wellbore, among other reasons, in order to remove a filter cake from the wellbore. In some such embodiments, the treatment fluids of the present disclosure may be continuously pumped down the casing or pipe and upwardly through an annulus in the wellbore in contact with the filter cake as a pre-flush just prior to introducing a spacer fluid and a cement slurry into the annulus. In some embodiments, the quantity of the treatment fluids of the present disclosure pumped through the annulus prior to introduction of the cementitious slurry (as well as other compositions used to dissolve components of the filter cake) may be a predetermined quantity calculated to remove substantially all of the filter cake, which may provide for a more successful and efficient cementing job.

Additionally or alternatively, in some embodiments, the treatment fluids of the present disclosure may be used in the course of a stimulation treatment. In such embodiments, the treatment fluids of the present disclosure may be introduced into a portion of a subterranean formation where it may be allowed to contact at least a portion of the subterranean formation and at least partially dissolve carbonate minerals therein so as to create one or more voids in the subterranean formation. In some embodiments, the treatment fluid may be introduced into the subterranean formation at or above a pressure sufficient to create or enhance one or more fractures within the subterranean formation, for example, at or above fracture-initiation pressure. In other embodiments, introduction of the treatment fluid may be carried out at a pressure below that which would create or enhance one or more fractures within the subterranean formation.

Additionally or alternatively, in some embodiments, the treatment fluid of the present disclosure may be used in the course of a fracturing treatment. In some embodiments, the treatment fluids of the present disclosure may be introduced into a portion of a subterranean formation (e.g., one or more fractures) containing a viscosified fracturing fluid. In such embodiments, at least a portion of the treatment fluid may contact the viscosified fracturing fluid to at least partially reduce the viscosity of the fracturing fluid. In some embodiments, the viscosified fracturing fluid may include proppants, and the proppants may be deposited within the subterranean formation, for example, within one or more fracture, as the viscosity of the fracturing fluid is at least partially reduced via the activity of the treatment fluid.

Additional or alternative subterranean operations in which the treatment fluid of the present disclosure may be used include, but are not limited to, pre-flush treatments, afterflush treatments, hydraulic fracturing treatments, sand control treatments (e.g., gravel packing), "frac-pack" treatments, wellbore clean-out treatments, stuck pipe treatments, filter cake removal treatments, skin remediation treatments, and other operations where a treatment fluid as disclosed herein may be useful. In some embodiments, the treatment fluid the present disclosure may also be used in cleaning operations or treatments conducted at the surface that are used to clean or prepare equipment or other components that are subsequently used in subterranean operations.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In some embodiments, the strong acid precursor and/or other components of the treatment fluid may be metered directly into a base fluid to form the treatment fluid. In some embodiments, the base fluid may be mixed with the strong acid precursor and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. Additionally or alternatively, in some embodiments, the treatment fluids of the present disclosure may be prepared, either in whole or in part, at an offsite location and transported to the site where the treatment or operation is conducted. Two or more components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

In some embodiments, one or more of the methods and compositions disclosed herein may directly or indirectly affect one or more components or pieces of equipment associated with the preparation, delivery, recapture, recycling, reuse, and/or disposal of the disclosed compositions. For example, with reference to the FIGURE, the disclosed methods and compositions may directly or indirectly affect one or more components or pieces of equipment associated with an example of a well and treatment system, according to one or more embodiments. Referring now to the FIGURE, a well 160 is shown in the context of an operation according to one or more embodiments of the present disclosure in a portion of a subterranean formation 110 surrounding a wellbore 120. In some embodiments, the subterranean formation 110 may include acid-soluble components. For example, the subterranean formation may be a carbonate formation, sandstone formation, mixed carbonate-sandstone formation, or any other subterranean formation as may be advantageous to undergo an acidizing treatment. The wellbore 120 extends from the surface 130 and through a portion of the subterranean formation 110 surrounding the horizontal portion of the wellbore. Although shown as vertical deviating to horizontal, the wellbore 120 may include horizontal, vertical, slanted, curved, and other types of wellbore geometries and orientations, and the treatment may be applied to a subterranean zone surrounding any portion of the wellbore. The wellbore 120 can include a casing 140 that is cemented or otherwise secured to the wellbore wall or can be uncased or include uncased sections. Perforations can be formed in the casing 140 to allow fluids and/or other materials to flow into the subterranean formation 110. In cased wells, perforations can be formed using shape charges, a perforating gun, hydro-jetting and/or other tools.

The well is shown with a work string 170 extending from the surface 130 into the wellbore 120. A pump and blender system 150 is coupled to the work string 170 to pump the treatment fluid 100, or other fluids, into the wellbore 120. The work string 170 may include coiled tubing, jointed pipe, and/or other structures that allow fluid to flow into the wellbore 120. The work string 170 can also include flow control devices, bypass valves, ports, and or other tools or well devices that control a flow of fluid from the interior of the work string 170 into the subterranean formation 110 or a zone thereof. For example, the work string 170 may include ports adjacent the wellbore wall to communicate the treatment fluid 100 directly into the subterranean formation 110, and/or the work string 170 may include ports that are spaced apart from the wellbore wall to communicate the treatment fluid 100 into an annulus in the wellbore 120 between the work string 170 and the wellbore wall.

The work string 170 and/or the wellbore 120 may include one or more sets of packers 180 effective to seal the annulus between the work string 170 and wellbore 120 and/or a downhole portion of the wellbore 120 to define an interval of the wellbore 120 into which particulate materials and/or treatment fluids will be pumped.

As shown, the wellbore 120 penetrates a portion of the subterranean formation 110, which may include a hydrocarbon-bearing reservoir. In some embodiments, a treatment fluid 100 may be pumped through the work string 170 and into the portion of the formation 110. In some embodiments, the treatment fluid 100 may create wormholes 195 in the portion of the subterranean formation 110.

In some embodiments, the injection of the treatment fluid 100 may be monitored at the well site. In some embodiments, one or more wellbore conditions may be monitored during injection, for example, temperature, pressure, fluid distribution, flow rate, pH, any physical or chemical property of the formation or formation fluids, and combinations thereof. For example, in some embodiments, one or more parameters, such as the injection rate, during injection based upon conditions such as fluid distribution and wellbore pressure.

In some embodiments, various wellbore conditions can be measured by sensors, which can be located in the wellbore. For purposes of this disclosure, the term "sensors" is understood to include sources (to emit and/or transmit energy and/or signals), receivers (to receive and/or detect energy and/or signals), and transducers (to operate as a source and/or receiver). In some embodiments, information from the sensors may be fed into a system or tool that can determine an injection rate or rate profile.

It is also to be recognized that the disclosed treatment fluids may directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Various of these components may be included in the systems generally described above in the FIGURE.

In some embodiments, a method includes providing a treatment fluid including a base fluid and a strong acid precursor. The strong acid precursor may be defined by Structure 1:

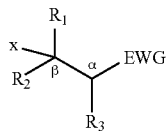

Structure 1 where X may be a halogen independently selected from fluorine (—F), chlorine (—Cl), bromine (—Br), and iodine (—I); where each of $R_1$, $R_2$, and $R_3$ may be independently selected from a hydrogen, X, and a $C_1$ to $C_{10}$ hydrocarbon chain; and where the EWG may be independently selected from a carboxylic acid, carboxylate salt, or carboxylate ester (—$CO_2Y$), an orthoester (—$C(OR')_3$), a sulfonic acid, sulfonate salt, or ester (—$CO_2Y$), a phosphonic acid, phosphonate salt, or phosphonate ester (—C—$PO(OY)_2$), a nitrate (—$CNO_2$), or a cyanide (—CN); where Y is hydrogen (—H), a cation, or a $C_1$ to $C_{10}$ hydrocarbon chain; and where each R' is independently may be independently selected from a hydrogen, X, and a $C_1$ to $C_{10}$ hydrocarbon chain.

In some embodiments, the strong acid precursor includes at least one compound independently selected from:

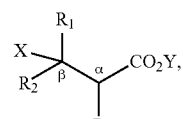

Structure 2

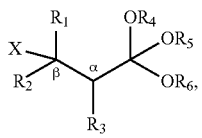

Structure 3

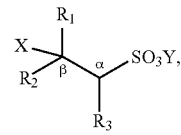

Structure 4

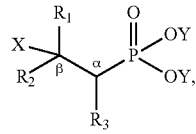

Structure 5

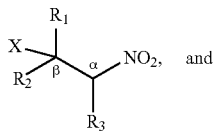

Structure 6

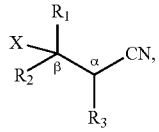

Structure 7 where X may be a halogen independently selected from fluorine (—F), chlorine (—Cl), bromine (—Br), and iodine (—I); where Y is hydrogen (—H), a cation, or a $C_1$ to $C_{10}$ hydrocarbon chain; where each of $R_1$, $R_2$, and $R_3$ may be independently selected from: a hydrogen, X, and a $C_1$ to $C_{10}$ hydrocarbon chain; and where each of $R_4$, $R_5$, and $R_6$ may be independently selected from a hydrogen and a $C_1$ to $C_{10}$ hydrocarbon chain.

The method also includes introducing the treatment fluid in a wellbore penetrating a subterranean formation. In one or more embodiments described in the preceding paragraph, the strong acid precursor generates a strong acid (HX) in the subterranean formation.

In some embodiments, the method also includes allowing the strong acid to acidize the portion of the subterranean formation or damage contained therein. In some embodiments, the method includes contacting at least a portion of a biopolymer or a filter cake located in the subterranean formation with the strong acid to at least partially degrade at least a portion of the biopolymer or the filter cake. In some embodiments, the method also includes introducing a catalytic acid or a catalytic acid precursor into the wellbore and contacting at least a portion of the treatment fluid with the catalytic acid or the catalytic acid precursor.

In one or more embodiments described in the preceding paragraph, the strong acid precursor is present in the treatment fluid in a concentration of from about 1% to about 20% by volume of the composition. In some embodiments, the treatment fluid includes an additive independently selected from, for example, surfactants, corrosion inhibitors, buffering agents, salts, acids, diverting agents, fluid loss control additives, gas, nitrogen, carbon dioxide, surface modifying agents, tackifying agents, foamers, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, gelling agents, breakers, weighting agents, relative permeability modifiers, resins, wetting agents, coating enhancement agents, filter cake removal agents, antifreeze agents, proppant particles, and combinations thereof. In some embodiments, the treatment fluid includes a catalytic acid or a catalytic acid precursor. In some embodiments, the catalytic acid or the catalytic acid precursor is present in the composition in a concentration of from about 0.01% to about 5% by volume of the treatment fluid.

ADDITIONAL DISCLOSURE

The following are non-limiting, specific embodiments in accordance with the present disclosure.

A first embodiment, which is the method comprising providing a treatment fluid comprising a strong acid precursor, the strong acid precursor comprising a compound defined by Structure 1:

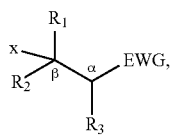

Structure 1 wherein X is a halogen independently selected from fluorine (—F), chlorine (—Cl), bromine (—Br), and iodine (—I); wherein each of $R_1$, $R_2$, and $R_3$ is independently selected from a hydrogen, X, and a $C_1$ to $C_{10}$ hydrocarbon chain; and wherein the electron withdrawing group (EWG) is independently selected from a carboxylic acid, carboxylate salt, or carboxylate ester (—$CO_2Y$), an orthoester (—$C(OR')_3$), a sulfonic acid, sulfonate salt, or ester (—$CO_2Y$), a phosphonic acid, phosphonate salt, or phosphonate ester (—C—PO$(OY)_2$), a nitrate (—$CNO_2$), or a cyanide (—CN); wherein Y is hydrogen (—H), a cation, or a $C_1$ to $C_{10}$ hydrocarbon chain; and wherein each R' is independently is independently selected from a hydrogen, X, and a $C_1$ to $C_{10}$ hydrocarbon chain; and introducing the treatment fluid into a wellbore penetrating a subterranean formation.

A second embodiment, which is the method of the first embodiment, wherein the strong acid precursor generates a strong acid (HX) within the subterranean formation.

A third embodiment, which is the method of the second embodiment, further comprising allowing the strong acid to acidize a portion of the subterranean formation or damage contained therein.

A fourth embodiment, which is the method of any one of the second through the third embodiments, further comprising contacting at least a portion of a biopolymer or a filter cake located in the subterranean formation with the strong acid, wherein the portion of the biopolymer or the filter cake at least partially degrades.

A fifth embodiment, which is the method of any one of the second through the fourth embodiments, further comprising allowing the strong acid to dissolve carbonate minerals in the subterranean formation.

A sixth embodiment, which is the method of any one of the second through the fifth embodiments, further comprising allowing the strong acid to contact a viscosified fracturing fluid in the subterranean formation.

A seventh embodiment, which is the method of any one of the second through the sixth embodiments, further comprising introducing the treatment fluid into the subterranean formation at or above a pressure sufficient to create or enhance one or more fractures within the subterranean formation.

An eighth embodiment, which is the method of any one of the first through the seventh embodiments, further comprising introducing a catalytic acid or a catalytic acid precursor into the wellbore; and contacting at least a portion of the treatment fluid with the catalytic acid or the catalytic acid precursor.

A ninth embodiment, which is the method of any one of the first through the eighth embodiments, wherein the treatment fluid has a pH of about 7 or greater when introduced into the wellbore, and wherein the pH of the treatment fluid is about 3 or less within about 2 hours after being introduced into the wellbore.

A tenth embodiment, which is the method for servicing a subterranean formation, the method comprising providing a treatment fluid comprising a base fluid and a strong acid precursor, wherein the strong acid precursor comprises at least one compound independently selected from:

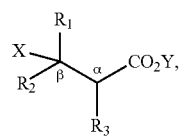

Structure 2

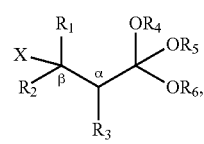

Structure 3

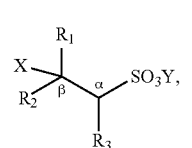

Structure 4

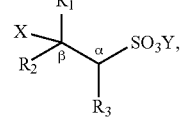

Structure 5

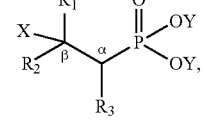

Structure 6 and

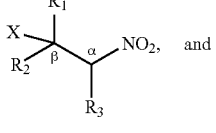

Structure 7 wherein X is a halogen independently selected from fluorine (—F), chlorine (—Cl), bromine (—Br), and iodine (—I); wherein Y is hydrogen (—H), a cation, or a $C_1$ to $C_{10}$ hydrocarbon chain; wherein each of $R_1$, $R_2$, and $R_3$ is independently selected from: a hydrogen, X, and a $C_1$ to $C_{10}$ hydrocarbon chain; and wherein each of $R_4$, $R_5$, and $R_6$ is independently selected from a hydrogen and a $C_1$ to $C_{10}$ hydrocarbon chain; introducing the treatment fluid in a wellbore penetrating the subterranean formation; and allowing the strong acid precursor to generate a strong acid within the subterranean formation.

An eleventh embodiment, which is the method of the tenth embodiment, further comprising allowing the strong acid to acidize a portion of the subterranean formation or damage contained therein.

A twelfth embodiment, which is the method of any one of the tenth through the eleventh embodiments, further comprising contacting at least a portion of a biopolymer or a filter cake located in the subterranean formation with the strong acid, wherein the portion of the biopolymer or the filter cake at least partially degrades.

A thirteenth embodiment, which is the method of any one of the tenth through the twelfth embodiments, further comprising allowing the strong acid to dissolve carbonate minerals in the subterranean formation.

A fourteenth embodiment, which is the method of any one of the tenth through the thirteenth embodiments, further comprising allowing the strong acid to contact a viscosified fracturing fluid in the subterranean formation.

A fifteenth embodiment, which is the method of any one of the tenth through the fourteenth embodiments, further comprising introducing the treatment fluid into the subterranean formation at or above a pressure sufficient to create or enhance one or more fractures within the subterranean formation.

A sixteenth embodiment, which is a treatment fluid comprising a base fluid and a strong acid precursor, wherein the strong acid precursor comprises at least one compound independently selected from:

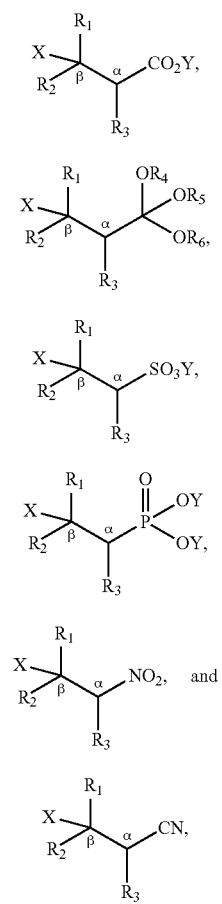

Structure 2

Structure 3

Structure 4

Structure 5

Structure 6

Structure 7 wherein X is a halogen independently selected from fluorine (—F), chlorine (—Cl), bromine (—Br), and iodine (—I); wherein Y is hydrogen (—H), a cation, or a $C_1$ to $C_{10}$ hydrocarbon chain; wherein each of $R_1$, $R_2$, and $R_3$ is independently selected from: a hydrogen, X, and a $C_1$ to $C_{10}$ hydrocarbon chain; and wherein each of $R_4$, $R_5$, and $R_6$ is independently selected from a hydrogen and a $C_1$ to $C_{10}$ hydrocarbon chain.

A seventeenth embodiment, which is the treatment fluid of the sixteenth embodiment, wherein the strong acid precursor is present in the treatment fluid in a concentration of from about 1% to about 20% by volume of the treatment fluid.

An eighteenth embodiment, which is the treatment fluid of any one of the sixteenth through the seventeenth embodiments, further comprising an additive independently be selected from surfactants, corrosion inhibitors, buffering agents, salts, acids, diverting agents, fluid loss control additives, gas, nitrogen, carbon dioxide, surface modifying agents, tackifying agents, foamers, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, gelling agents, breakers, weighting agents, relative permeability modifiers, resins, wetting agents, coating enhancement agents, filter cake removal agents, antifreeze agents, proppant particles, and combinations thereof.

A nineteenth embodiment, which is the treatment fluid of any one of the sixteenth through the eighteenth embodiments, further comprising a catalytic acid or a catalytic acid precursor.

A twentieth embodiment, which is the treatment fluid of any one of the sixteenth through the nineteenth embodiments, wherein the catalytic acid or the catalytic acid precursor is present in the treatment fluid in a concentration of from about 0.010% to about 5% by volume of the treatment fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising an acid precursor, the acid precursor comprising a compound defined by Structure 1:

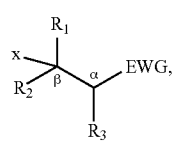

Structure 1 wherein X is a halogen independently selected from fluorine (—F), chlorine (—Cl), bromine (—Br), and iodine (—I); wherein each of $R_1$, $R_2$, and $R_3$ is independently selected from a hydrogen, X, and a $C_1$ to $C_{10}$ hydrocarbon chain; and
wherein the electron withdrawing group (EWG) is a carboxylate ester (—$CO_2Y$);
wherein Y is hydrogen (—H), a cation, or a $C_1$ to $C_{10}$ hydrocarbon chain; and introducing the treatment fluid into a wellbore penetrating a subterranean formation.

2. The method of claim 1, wherein the acid precursor generates an acid (HX) within the subterranean formation.

3. The method of claim 2, further comprising allowing the acid to acidize a portion of the subterranean formation or damage contained therein.

4. The method of claim 2, further comprising contacting at least a portion of a biopolymer or a filter cake located in the subterranean formation with the acid, wherein the portion of the biopolymer or the filter cake degrades.

5. The method of claim 2, further comprising allowing the acid to dissolve carbonate minerals in the subterranean formation.

6. The method of claim 2, further comprising allowing the acid to contact a viscosified fracturing fluid in the subterranean formation.

7. The method of claim 1, further comprising introducing the treatment fluid into the subterranean formation at or above a pressure sufficient to create or enhance one or more fractures within the subterranean formation.

8. The method of claim 1, further comprising:
introducing a catalytic acid or a catalytic acid precursor into the wellbore; and
contacting at least a portion of the treatment fluid with the catalytic acid or the catalytic acid precursor.

9. The method of claim 1, wherein the treatment fluid has a pH of about 7 or greater when introduced into the wellbore, and wherein the pH of the treatment fluid is about 3 or less within about 2 hours after being introduced into the wellbore.

10. The method of claim 1, further comprising
allowing the acid precursor to generate an acid within the subterranean formation.

11. The method of claim 10, further comprising allowing the acid to acidize a portion of the subterranean formation or damage contained therein.

12. The method of claim 10, further comprising contacting at least a portion of a biopolymer or a filter cake located in the subterranean formation with the acid, wherein the portion of the biopolymer or the filter cake degrades.

13. The method of claim 10, further comprising allowing the acid to dissolve carbonate minerals in the subterranean formation.

14. The method of claim 10, further comprising allowing the acid to contact a viscosified fracturing fluid in the subterranean formation.

\* \* \* \* \*